United States Patent [19]

Messing

[11] 3,910,823

[45] Oct. 7, 1975

[54] IMMOBILIZATION OF UREASE ON POROUS TITANIA

[75] Inventor: Ralph A. Messing, Horseheads, N.Y.

[73] Assignee: Corning Glass Works, Corning, N.Y.

[22] Filed: Mar. 25, 1974

[21] Appl. No.: 454,140

[52] U.S. Cl. .............. 195/63; 195/68; 195/DIG. 11
[51] Int. Cl.² ............................................ C07G 7/02
[58] Field of Search .................. 195/63, 68, DIG. 11

[56] References Cited
UNITED STATES PATENTS

| | | | |
|---|---|---|---|
| 3,666,627 | 5/1972 | Messing | 195/68 |
| 3,783,101 | 1/1974 | Tomb et al. | 195/63 |
| 3,841,969 | 10/1974 | Emery et al. | 195/63 |

*Primary Examiner*—David M. Naff
*Attorney, Agent, or Firm*—James A. Giblin; Clinton S. Janes, Jr.; Clarence R. Patty, Jr.

[57] ABSTRACT

An immobilized urease composite having improved stability and half life can be prepared by reacting a porous titania carrier having an average pore diameter between about 300A and 590A with a solution containing stannous ions and then reacting the pre-treated carrier with a urease solution.

3 Claims, No Drawings

IMMOBILIZATION OF UREASE ON POROUS TITANIA

RELATED APPLICATION

U.S. Pat. application Ser. No. 332,807, now U.S. Pat. No. 3,850,751 filed on Feb. 16, 1973 in the name of R. A. Messing, entitled "Enzymes Immobilized On Porous Inorganic Support Materials," and assigned to the present assignee.

BACKGROUND OF THE INVENTION

1. Field

This invention relates generally to the immobilization of enzymes on and within porous inorganic carrier materials and specifically to the immobilization of urease on and within porous titania support materials.

2. Prior Art

In my patent application Ser. No. 332,807, cited above, it was shown that the half lives and stability of composites consisting of enzymes bonded on and within porous inorganic carriers can be enhanced by critically relating average pore size of the carrier to the molecular size of enzymes and/or enzyme substrates. In that application, it was disclosed that a maximum amount of urease could be absorbed within a porous titania carrier having an average pore diameter between about 300A and about 590A, the average pore diameter of the examples being about 420A. Such porous titania can be made in accordance with the disclosures in my copending patent application Ser. No. 344,964, filed on Mar. 26, 1973, entitled "Method Of Making Porous Inorganic Bodies" and assigned to the present assignee.

I have now found that an even more stable immobilized urease composite can be prepared by the methods disclosed more fully hereunder.

SUMMARY OF THE INVENTION

My method of preparing an immobilized urease composite comprises the steps of reacting porous titania particles having an average pore diameter between about 300A and 590A with an aqueous solution of stannous ions to pretreat the surface of the titania carrier and then reacting the treated carrier with an aqueous solution of urease. In preferred embodiments, my method comprises using a stannous chloride solution having a concentration between about 0.1 and 10% by weight as a source for the stannous ions and using porous titania particles having an average size between about 4 and 200 mesh, United States Standard Sieve.

Specific Embodiments

The preparation of porous titania bodies having an average pore diameter between about 100A and 1000A is described in Ser. No. 344,964, cited above. Very generally, porous $TiO_2$ bodies having closely controlled average pore diameters between about 300A and 590A can be prepared by agglomerating $TiO_2$ particles of controlled particle size (e.g. about 410A average particle diameter). Such particles are known commercially under the tradename Cab-O-Ti (Cabot Corp., Boston, Massachusetts). Specifically, the porous $TiO_2$ bodies used in the examples below were made by mixing a slurry of $TiO_2$ particles having an average particle size of about 410A and 0.1 M acetic acid (100 grams of $TiO_2$ and 170 ml. of the acid), drying the slurry, and then firing the dried product at about 525°C. for about 1 ½-3 hours. The resulting porous bodies are then comminuted by known methods to the desired particle size.

The porous titania carrier used in the examples below had the physical properties shown in Table I and was made from $TiO_2$ particles having physical properties also shown in that Table.

TABLE I

| $TiO_2$ | (Physical Properties) Starting Material | Porous Bodies |
|---|---|---|
| Particle Diameter (A) | 410 | |
| Surface Area (m²/g) | 35 | 35 |
| Min. Pore Diameter (A) | | 300 |
| Avg. Pore Diameter (A) | | 420 |
| Max. Pore Diameter (A) | | 590 |
| Mesh Size (U.S.S.S.) | | 30–80 |
| Pore Volume (cc/g) | | 0.4 |

The exact mechanism by which the pre-treatment with a stannous salt solution enhances the bonding ability of the titania carrier for urease is not fully understood. However, it is possible that the salt, on dissociation in aqueous solution, forms a number of surface stannous bridges capable of reacting with available sulfhydryl groups on the urease molecule. Unlike many enzymes which are elongate, urease is substantially spherical; thus, it would be expected that the enzyme would offer few bonding sites which actually contact the titania surface. Hence, it is possible that available stannous ions somehow (e.g. by forming hair-like surface projections) provide a mechanism for bonding more sites on the urease than is possible by simple adsorptive forces.

In the examples below, I used a stannous chloride solution as a source for stannous ions although it is thought other stannous salts which readily dissociate in water could also be used (e.g. $SnBr_2$, $SnI_2$, $SnSO_4$, $Sn(NO_3)_2$) to pre-treat the carrier. The stannous salt treating solution should have a concentration of between about 0.1% and about 10% by weight, preferably about 1% by weight. The surface should be treated for at least 5 minutes. The treated carrier is then reacted with a urease solution for at least about 1 hour. To have a basis for comparing the stability and half lives of immobilized urease composites prepared by pre-treating the carrier with a stannous salt solution, I also prepared a urease composite according to the method described in Ser. No. 332,807. With the exception of the pretreatment step with the stannous chloride solution, all methods and materials used were essentially identical. The urease solution was a crude Jack Bean preparation supplied by Nutritional Biochemicals Corp. of Cleveland, Ohio and was characterized as having an activity of 400 Sumner Units (S.U.) per gram. The stannous chloride salt used was a reagent grade dihydrated salt. The aqueous stannous chloride treating solution contained about 1% by weight of the salt.

Preparation of Control Composites (Urease Adsorbed Directly To Porous Titania)

A 500 ml. sample of the above-described carrier (without the stannous pre-treatment) was preconditioned by shaking the sample in 11 ml. of 0.5 M sodium bicarbonate at 37°C. for 1 hour and 40 minutes, after which the sodium bicarbonate solution was decanted. Then, 20 ml. of a 1% aqueous urease solution which contained 400 Sumner Units (S.U.) of urease activity per gram or 80 S.U. per 20 ml. was added to the carrier. The carrier and the urease solution were shaken in a water bath at 37°C. for 5 hours. The mixture was then allowed to stand at room temperature for 22 hours, after which the enzyme solution was decanted and the enzyme composite was washed successively with 20 ml. volumes of distilled water, 0.5 M sodium chloride solution, and distilled water. The composite was then transferred to a small stopcock column where it was stored at room temperature in water and periodically assayed by differential conductivity methods during the half life studies. The conductivity results were converted into Sumner Units.

The conductivity assay and equipment was similar to that described for determining glucose concentrations or glucose oxidase activity, as described in Ser. No. 390,005, now U.S. Pat. No. 3,839,154 filed in my name on Aug. 20, 1973, entitled "Apparatus For Measuring Conductivity Changes In A Glucose-Glucose Oxidase Reaction," and assigned to the present assignee. A conversion factor for conductivity units to Sumner Units was determined utilizing a Wescan conductivity meter with a recorder attached and a K=80 cell. The substrate solution was 6% or 1 M urea in distilled water. Various quantities of urease from 0.008 through 0.04 S.U. were added to 10 ml. volumes of substrate solution each of which was circulated through a conductivity cell at a rate of 390 ml. per hour. After the initial contribution due to the enzyme itself (after approximately a 1 minute interval) a linear slope developed for each level of enzyme. This slope in micromhos per minute was determined for each enzyme level and a conversion factor was calculated. For this 10 ml. volume sample the conversion factor to Sumner Units was 77.7 micromhos per minute per S.U.

The activities of the immobilized enzymes (control and examples) were determined by circulating 40 ml. of 1 M urea solution at 390 ml. per hour through the columns containing the immobilized enzyme. The slope that developed was multiplied by 4 before utilizing the conversion factor because 40 ml. of substrate solution was used in place of the 10 ml. volume utilized to determine the conversion factor. The dilution corrected slope was then divided by 77.7 to determine the number of Sumner units. The assays were performed at room temperature and the immobilized enzymes were stored in water at room temperature between assays over the half life determination period. All immobilized enzyme samples were repetitively assayed as indicated below.

Example I

Urease Immobilized on Titania with a Stannous Pre-Treatment

A 500 mg sample of titania carrier was preconditioned with 20 ml. of a 1% $SnCl_2.2H_2O$ solution by placing both in a shaking water bath at 37°C. for 45 minutes. The stannous chloride solution was then decanted and the carrier was washed with 3 aliquots containing 20 ml. of distilled water. After the final wash was decanted, 20 ml. of a 1% aqueous urease solution containing 80 Sumner Units was added to the carrier. The carrier sample and urease solution was shaken in a water bath at 37°C. for 2 hours. The mixture was then allowed to stand at room temperature for 22 hours, after which the enzyme solution was decanted and the enzyme composite was washed successively with 20 ml. volume of distilled water, 0.5 M sodium chloride solution and distilled water. The composite was then transferred to a small column where it was stored in water at room temperature and assayed periodically using a one molar urea solution (6%) to determine composite activity with time and the half life.

Example II

Scale Up of Urease Immobilized on Stannous Treated Titania

A 2 gm sample of similar porous titania carrier was preconditioned by shaking the sample in 80 ml. of the previously described stannous chloride solution for 40 minutes in a shaking water bath at 37°C. The stannous chloride solution was then decanted and the carrier was washed three times with 80 ml. aliquots of distilled water. After the last wash was decanted, 80 ml. of a 1% aqueous urease solution containing 320 S.U. was added to the carrier. The carrier and urease solution were shaken in a water bath at 37°C. for 2 hours. The mixture was then allowed to stand at room temperature for 19 hours, after which the enzyme solution was decanted and the enzyme composite was washed successively with 80 ml. volumes of distilled water, 0.5 M sodium chloride and finally distilled water. The total volume occupied by the 2 gms of immobilized enzyme was 2.6 cc. A 0.65 cc volume or 500 mg was removed from the batch and transferred into a small column for assay and storage purposes. The sample was stored in water at room temperature and assayed with one molar urea at room temperature over the period of half-life determination.

The activities of the control composite and the composites of Examples I and II were measured to determine storage stability over a period of up to 62 days. The results are indicated in Table II.

TABLE II

| Days of Storage | [Activity (Summer Units per gram)] | | |
|---|---|---|---|
| | Control | Example 1 | Example 2 |
| 0 | — | — | 3.44 |
| 1 | 4.36 | — | — |
| 2 | — | 2.80 | — |
| 3 | — | 2.80 | 2.80 |
| 5 | 2.32 | — | 3.12 |
| 6 | 1.98 | 2.80 | — |
| 7 | 1.98 | 2.54 | — |
| 8 | 1.56 | 2.38 | — |
| 9 | — | 2.26 | — |
| 10 | — | 2.00 | — |
| 12 | 1.11 | — | 3.04 |
| 13 | 1.60 | — | — |
| 15 | 1.48 | — | — |
| 19 | 0.73 | — | — |
| 21 | — | 1.30 | 2.46 |
| 24 | — | 1.64 | — |
| 27 | — | 1.44 | 2.46 |
| 28 | 0.47 | — | — |
| 29 | — | 1.40 | — |
| 31 | — | — | 2.04 |
| 32 | — | — | 1.72 |
| 34 | 0.34 | 1.10 | — |
| 36 | — | 1.18 | — |
| 40 | — | — | 1.40 |
| 43 | — | 1.06 | — |
| 52 | — | 0.82 | — |
| 58 | — | 0.82 | — |
| 62 | — | 0.68 | — |

From the results indicated in Table II, it is apparent that the control without a stannous pre-treatment has a half life of less than 7 days. This material did not at any time turn blue during the storage period. In examples 1 and 2, which contained the stannous ion bridge, within one day after the preparation, the immobilized enzymes in both cases turned blue. If in example 1, one considers the stable loading of 2.80 Sumner Units per gram, it can be noted from the results that a half life of 1.40 is reached at close to 30 days or 29 days, and the composite may remain stable beyond that point, but no more than 34 days. On the other hand, in example 2, it would appear that the stable activity is approximately 3.1 Sumner Units per gram. The half life from the results recorded in the table appears to be somewhere between 32 and 40 days. The half life or a value of 1.55 S.U. per gram was not achieved at 32 days, but was passed at 40 days.

I claim:

1. A method of preparing an immobilized urease composite comprising the steps of reacting porous titania carrier particles having a particle size of between about 4 and 200 mesh, United States Standard Sieve, and an average pore diameter between about 300A and 590A and consisting of agglomerated titania particles with an aqueous solution of a stannous salt for at least 5 minutes to pre-treat the carrier surface and then reacting the pre-treated carrier with a urease solution.

2. The method of claim 1 wherein the stannous salt solution consists of stannous chloride dissolved in water, the concentration of the salt being between about 0.1 and 10% by weight.

3. An immobilized urease composite prepared in accordance with the method of claim 1.

* * * * *